US009600063B2

(12) United States Patent
Laur

(10) Patent No.: US 9,600,063 B2
(45) Date of Patent: Mar. 21, 2017

(54) ENHANCED PEAK CURRENT-MODE PULSE-WIDTH-MODULATED (PWM) SWITCHING REGULATORS

(71) Applicant: INTERSIL AMERICAS LLC, Milpitas, CA (US)

(72) Inventor: Steve Laur, Raleigh, NC (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 14/789,592

(22) Filed: Jul. 1, 2015

(65) Prior Publication Data

US 2016/0274651 A1    Sep. 22, 2016

Related U.S. Application Data

(60) Provisional application No. 62/135,054, filed on Mar. 18, 2015, provisional application No. 62/168,764, filed on May 30, 2015.

(51) Int. Cl.
*H02M 3/158* (2006.01)
*G06F 1/32* (2006.01)

(52) U.S. Cl.
CPC .......... *G06F 1/3287* (2013.01); *H02M 3/158* (2013.01)

(58) Field of Classification Search
CPC ............... G06F 1/3287; H02M 3/158
See application file for complete search history.

(56) References Cited

U.S. PATENT DOCUMENTS

| 6,495,995 | B2 * | 12/2002 | Groom | ................ | H02M 3/1584 323/283 |
| 7,023,182 | B1 * | 4/2006 | Kleine | ................ | H02M 3/1584 323/212 |
| 8,299,764 | B2 | 10/2012 | Laur et al. | | |
| 8,405,368 | B2 | 3/2013 | Laur et al. | | |
| 8,629,662 | B2 | 1/2014 | Laur et al. | | |
| 2010/0017042 | A1 * | 1/2010 | Lopata | .................. | G06F 1/3203 700/286 |
| 2011/0234193 | A1 * | 9/2011 | Laur | .................... | H02M 3/1584 323/311 |
| 2013/0069611 | A1 * | 3/2013 | Menegoli | ............ | H02M 3/1584 323/284 |
| 2013/0106378 | A1 * | 5/2013 | Khlat | ...................... | H02M 1/15 323/282 |
| 2014/0002043 | A1 * | 1/2014 | Li | .......................... | H02M 3/156 323/282 |

* cited by examiner

*Primary Examiner* — Emily P Pham
(74) *Attorney, Agent, or Firm* — Fogg & Powers LLC

(57) ABSTRACT

A system, switching regulators, and methods of control for enhanced peak current-mode PWM switching regulators are disclosed. For example, a switching regulator is disclosed, which includes a master controller circuit and a slave controller circuit coupled to the master controller circuit, wherein the slave controller circuit is configured to generate a ripple current at a first ripple node, and a sensor circuit is configured to sense the ripple current at the first ripple node and convey the sensed ripple current to a second ripple node in the master controller circuit. In some implementations, the switching regulator is part of a power subsystem formed on one or more semiconductor ICs, wafers, chips or dies.

25 Claims, 9 Drawing Sheets

THREE PHASE SYSTEM (MASTER)

MULTIPHASE IMPLEMENTATION 1
DEPICTED IN FIGURE 5

MULTIPHASE IMPLEMENTATION 2
DEPICTED IN FIGURE 6

ENHANCED PEAK CURRENT-MODE PULSE-WIDTH-MODULATED (PWM) SWITCHING REGULATORS

CROSS-REFERENCE TO RELATED APPLICATIONS

This application is related to U.S. Provisional Patent Application Ser. No. 62/135,054 entitled "ENHANCED PEAK CURRENT MODE MULTI-PHASE PULSE-WIDTH-MODULATED (PWM) CONTROLLERS," filed on Mar. 18, 2015 and incorporated herein by reference, and U.S. Provisional Patent Application Ser. No. 62/168,764 entitled "ENHANCED PEAK CURRENT-MODE PULSE-WIDTH-MODULATED (PWM) SWITCHING REGULATORS," filed on May 30, 2015 and also incorporated herein by reference. This application hereby claims to the benefit of U.S. Provisional Patent Application Ser. Nos. 62/135,054 and 62/168,764.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

Figure 1:
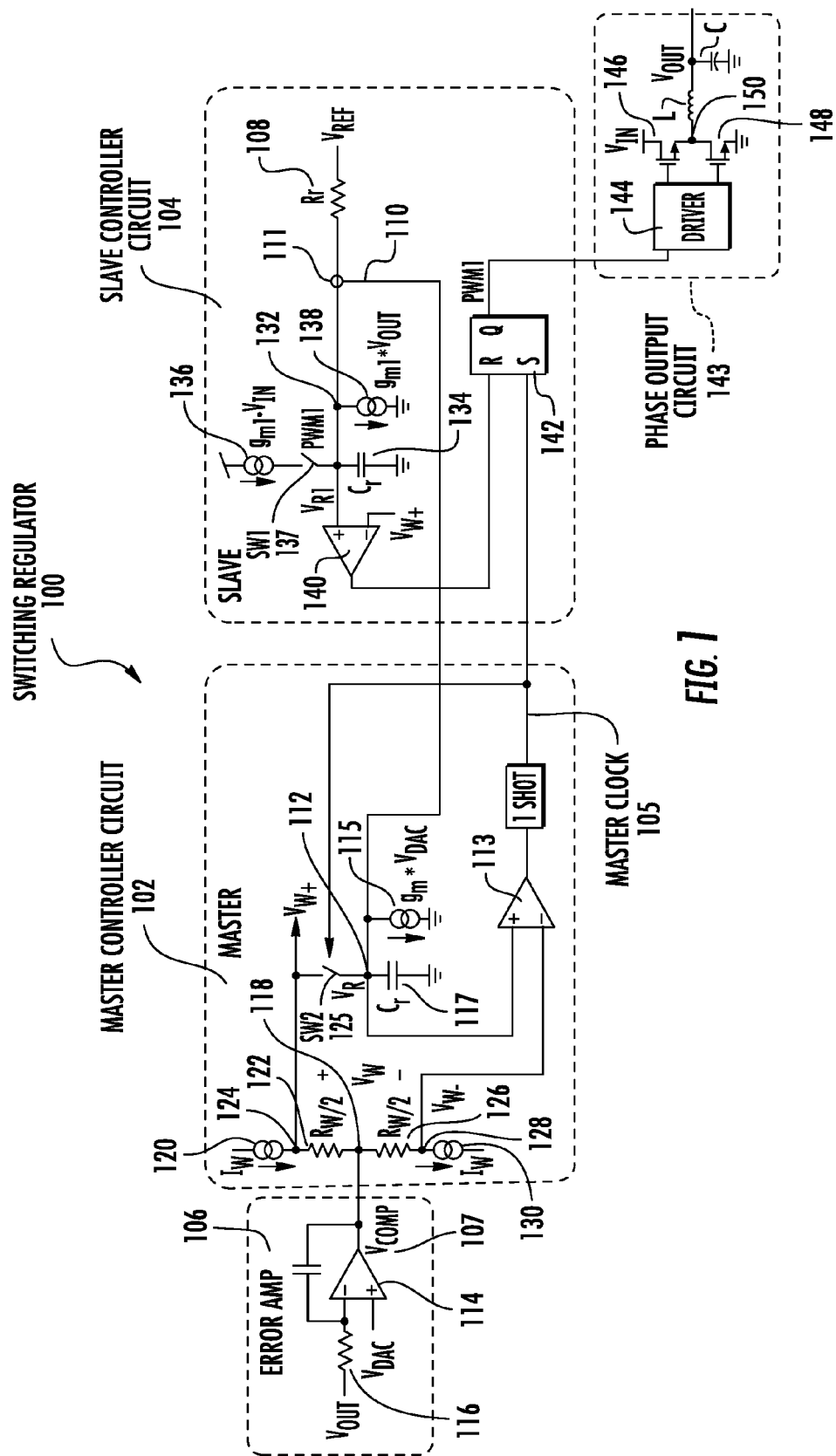
FIG. 1 depicts a schematic circuit diagram of a peak current-mode PWM switching regulator, which can be utilized to implement one exemplary embodiment of the present invention.

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

An architectural flaw in existing master/slave single-phase and multi-phase peak current-mode Pulse-Width-Modulated (PWM) switching regulators causes three problems: 1) Sub-harmonic recovery to load transient events; 2) Output voltage disturbance during dynamic output voltage slewing (e.g., utilizing dynamic voltage identification or DVID); and 3) Large-signal anomalies that result from mismatches between the master and slave controller circuits being utilized. Compounding these problems, certain end users require product developers to utilize all-ceramic output capacitor filters coupled with small inductance values. Consequently, these highly phase-lagged filters push the performance of existing PW modulators to the point where the flaw is exposed. An existing fix is to add bulk electrolytic capacitance to the output filter. However, this approach is not cost-effective and places the product developers at a competitive disadvantage as a result.

FIG. 1 depicts a schematic circuit diagram of a peak current-mode PWM switching regulator 100, which can be utilized to implement one exemplary embodiment of the present invention. For example, the circuit diagram depicted in FIG. 1 can be utilized to implement a step down (e.g., buck) single-phase master/slave peak current-mode switching regulator utilizing, for example, the R3 synthetic current architecture developed by Intersil Americas LLC. The circuit diagram depicted in FIG. 1 can also be adapted for valley current-mode switching regulator operations. In the embodiment depicted in FIG. 1, the entire ripple alternating current (AC) and direct current (DC) information is sensed in the slave controller circuit and shared with the master controller circuit, which causes the curvatures of the ripple voltage waveform, $V_R$, in the master controller circuit and $V_{R1}$ in the slave controller circuit to be substantially similar to each other over a wide dynamic range of operations. The ripple voltage (e.g., $V_{R1}$) is the voltage developed across the ripple capacitor, Cr, which is discharged by the ripple resistor, Rr, at an appropriate rate to prevent charge build-up and thereby enhance the frequency response of the switching regulator.

In the exemplary embodiment shown in FIG. 1, the switching regulator 100 includes a master controller circuit 102, a slave controller circuit 104, an error amplifier circuit 106, and a phase output circuit 143. Note that in the exemplary embodiment shown, the circuit components of the phase output circuit 143 are formed on a separate integrated circuit, wafer, chip or die from that of the slave controller circuit 104. In a second embodiment, the circuit components of the phase output circuit 143 can be formed along with the circuit components of the slave controller circuit 104 on the same integrated circuit, wafer, chip or die. Also, in the exemplary embodiment shown, the circuit components of the master controller circuit 102 are formed on a separate integrated circuit, wafer, chip or die from that of the error amplifier circuit 106. In a second embodiment, the circuit components of the master controller circuit 102 and error amplifier circuit 106 can be formed on the same integrated circuit, wafer, chip or die. In any event, the timing signals for the master controller circuit 102 and the slave controller circuit 104 are generated by the master clock 105. The error amplifier circuit 106 outputs the compensation voltage, $V_{COMP}$ 107, which is coupled to the input of the master controller circuit 102. Thus, the master controller circuit 102 and the slave controller circuit 104 control the output voltage, $V_{OUT}$, in response to the input compensation voltage, $V_{COMP}$ 107. The output voltage, $V_{OUT}$, is utilized as a feedback signal and coupled back to the input, $V_{OUT}$, of the error amplifier circuit 106.

Specifically, in the exemplary embodiment shown in FIG. 1, the feedback voltage at the input, $V_{OUT}$, of the error amplifier circuit 106 is coupled to the inverting input of the error amplifier 114 through a resistor 116. The voltage, $V_{DAC}$, which is coupled to the non-inverting input of the error amplifier 114, has a voltage level that indicates the target voltage level for the output voltage, $V_{OUT}$, of the switching regulator 100. The compensation voltage $V_{COMP}$ 107, which is generated at the output of the error amplifier 114 in response to the comparison of the input voltages, $V_{OUT}$ and $V_{DAC}$, is coupled to the compensation node 118. A first current source 120 provides a window current, $I_W$, to one end of a first window resistor 122 at a positive window node 124 that develops a positive window voltage, $V_{W+}$. The other end of the first window resistor 122 is connected to the compensation node 118. The compensation node 118 is also connected to one end of a second window resistor 126, and the other end of the second window resistor 126 is connected to a negative window node 128, which develops a negative window voltage, $V_{W-}$. A current sink 130 sinks the window current, $I_W$, from the negative window node 128. Each one of the first and second window resistors 122, 126 has substantially the same resistance so that the window voltages, $V_{W+}$ and $V_{W-}$, are offset from the voltage on the compensation node 118 by substantially the same amount in, for example, a balanced window voltage configuration.

The positive window node 124 is connected to a first switch terminal of a switch SW2 125, and a second switch terminal of the switch SW2 125 is connected to the node 112, one end of the ripple capacitor, $C_R$ 117, and the non-inverting input of the comparator 113. In this embodiment, the SW2 125 can be implemented with a transistor switch such as, for example, a MOSFET switch, or any other suitable electronic switch that can formed on a semiconductor integrated circuit, wafer, chip or die. The other end of the ripple capacitor, $C_R$ 117, is connected to the reference voltage (e.g., ground). A current sink 115 sinks the current, $g_m*V_{DAC}$, from the ripple node 112 to the reference voltage (e.g., ground). As shown, the current sink 115 generates a transconductance gain, $g_m$, multiplied by the voltage, $V_{DAC}$, to develop a current that is proportional to the voltage, $V_{DAC}$. The negative window node 128 is connected to the inverting input of the comparator 113, and the output of the comparator 113 is connected to the input of the 1-SHOT which generates the master clock 105 on its output. The master clock 105 is connected to the control terminal of the switch, SW2, and also to the set (S) input of the RS flip-flop 142 in the slave controller circuit 104.

The slave controller circuit 104 includes a ripple resistor, Rr 108. The reference voltage, $V_{REF}$, is coupled to one end of the ripple resistor, Rr 108. The other end of the ripple resistor, Rr 108, is connected to a ripple node 132, which develops a ripple voltage, $V_{R1}$, across the ripple capacitor, Cr 134 connected between the ripple node 132 and ground. A current source 136 provides a current, $g_{m1}*V_{IN}$, to a first switch terminal of a switch SW1 137, and a second switch terminal of the switch SW1 137 is connected to the ripple node 132. In this embodiment, the SW1 137 can be implemented with a transistor switch such as, for example, a MOSFET switch, or any other suitable electronic switch that can formed on a semiconductor integrated circuit, wafer, chip or die. As shown, the current value generated by current source 136 corresponds to a transconductance gain, $g_{m1}$, multiplied by the input voltage, $V_{IN}$, to develop a source current that is proportional to the input voltage, $V_{IN}$. The signal PWM1 is utilized to control the switch SW1 137. A current sink 138 sinks the current, $g_{m1}*V_{OUT}$, from the ripple node 132 to ground. As shown, the current value generated by current sink 138 corresponds to a transconductance gain, $g_{m1}$, multiplied by the output voltage, $V_{OUT}$, to develop a sink current that is proportional to the output voltage, $V_{OUT}$. The ripple node 132 is connected to the non-inverting input of the comparator 140. The positive window voltage, $V_{W+}$, which is generated in the master controller circuit 102, is coupled to the inverting input of the comparator 140. The output of the comparator 140 is connected to the reset, R, input of the RS flip-flop 142. The Q output of the RS flip-flop 142 is connected to the input of a switch driver module 144 in the phase output circuit 143. The switch driver module 144 controls the operations of electronic switches (e.g., switching transistors) 146 and 148. The drain of electronic switch 146 is connected to the input voltage, $V_{IN}$, the source of electronic switch 148 is connected to a circuit reference voltage (e.g., circuit ground), the source of electronic switch 146 and the drain of electronic switch 148 are connected to a phase node 150, and the gates of the electronic switches 146, 148 are connected to respective outputs of the switch driver module 144. The phase node 150 is connected to one end of the output inductor, L, and the other end of the output inductor, L, is connected to the filter capacitor, C, which is also connected to the reference voltage (e.g., ground). Thus, the output voltage, $V_{OUT}$, is generated at the node between the output inductor, L, and the filter capacitor, C, in response to the operations of the switch driver module 144 and electronic switches 146, 148.

In operation, the PWM1 signal toggles high and low to control the switching operation of the phase. When the RS flip-flop 142 asserts the PWM1 signal high, the switch driver module 144 turns on the electronic switch 146 (sometimes called high side switch) and turns off the electronic switch 148 (sometimes called low side switch) so that the voltage, $V_{IN}$, is effectively coupled to the phase node 150. When the PWM1 signal goes low, the switch driver module 144 turns off the electronic switch 146 and turns on the electronic switch 148 so that the phase node 150 is effectively coupled to ground. As the PWM1 signal toggles high and low during multiple switching cycles, the switch driver module 144 and the electronic switches 146, 148 toggle the coupling of the phase node 150 between $V_{IN}$ and ground to convert the input voltage, $V_{IN}$, to the output voltage, $V_{OUT}$, through the output inductor, L and output capacitor, C. In the exemplary embodiment shown, the switching regulator 100 operates as a buck regulator in which the input voltage, $V_{IN}$, is greater than the output voltage, $V_{OUT}$. However, in a second embodiment, the switching regulator 100 can be implemented to operate as a boost regulator in which the output voltage, $V_{OUT}$, is greater than the input voltage, $V_{IN}$.

The current sink 138 draws a substantially constant current, $g_{m1}*V_{OUT}$, from the ripple node 132, and draws a charge from the ripple capacitor Cr 134. When the ripple voltage, $V_{R1}$, is greater than the reference voltage, $V_{REF}$, an additional current flows from the ripple node 132 through the ripple resistor, Rr 108. When the ripple voltage $V_{R1}$, is less than the reference voltage, $V_{REF}$, an additional charge current flows from the reference voltage terminal, $V_{REF}$, through the ripple resistor, Rr 108. When the RS flip-flop 142 asserts the PWM1 signal high, the phase network drives current to the output terminal, $V_{OUT}$. Also, when the PWM1 signal is high, the switch SW1 137 is closed so that the current, $g_{m1}*V_{IN}$, from the current source 136 flows to the ripple node 132 to charge the ripple capacitor, Cr, 134. While the switch SW1 137 is closed, the ripple voltage, $V_{R1}$, rises to the level of the positive window voltage, $V_{W+}$. When the ripple voltage, $V_{R1}$, rises above the level of the positive window voltage, $V_{W+}$, the comparator 140 outputs a signal that resets the RS flip-flop 142 and toggles the PWM1 signal to low. When the PWM1 signal is low, the switch SW1 137 is opened so that the ripple voltage, $V_{R1}$, begins to ramp down at approximately a constant rate. The RS flip-flop 142 is set by the next master clock 105 pulse thus closing switch SW1 137 and starting the up ramp of the $V_{R1}$ ripple voltage. The type of switching regulator controller shown in FIG. 1 is often referred to in the art as a synthetic ripple current controller, as the ripple voltage $V_{R1}$ is synthesized to correspond to the ripple current of the inductor, L.

The ripple resistor, Rr 108, in the slave controller circuit 104 is utilized to enable the DC value of the compensation voltage, $V_{COMP}$ 107, to modulate the duty cycle of the PW modulator switch, SW1 137, in the slave controller circuit 104. Without the ripple resistor, Rr 108, in the exemplary slave controller circuit 104 as shown, the DC value of the compensation voltage, $V_{COMP}$ 107, would have no effect on the duty cycle of the PW modulated signal in this slave controller circuit. In other words, the slope (or duty cycle) of the voltage waveform, $V_{R1}$, in the slave controller circuit 104 would not change even if the value of the compensation voltage, $V_{COMP}$ 107, were to become greater or less than the reference voltage, $V_{REF}$, in a DC fashion.

In the exemplary embodiment shown in FIG. 1, the current through the ripple resistor, Rr 108, is sensed by a suitable current sensor circuit 111 and coupled via line 110 to the ripple node 112 connected to the PW modulator switch, SW2 125, in the master controller circuit 102. The current sensor circuit 111 can be implemented utilizing suitable current sensing circuitry as known in the art, such as, for example, a resistor connected in series with the ripple resistor Rr 108 to develop a voltage representing the current through the ripple resistor Rr 108, a filter circuit coupled to the ripple node 112, or any other suitable technique that can be utilized to sense the current through the ripple resistor Rr 108. In any event, coupling the current through the ripple resistor, Rr 108, to the ripple node 112 in the master controller circuit 102 adds that current to the current ($g_m*V_{DAC}$) present at the ripple node 112, and thereby ensures that the curvature of the waveform of the ripple voltage $V_{R1}$ in the slave controller circuit 104 very closely approximates the curvature of the waveform of the ripple voltage $V_R$ in the master controller circuit 102. For example, referring to the exemplary waveform diagrams depicted in FIG. 2, the curvature of the master voltage VR waveform 250 as it is ramping down very closely approximates the curvature of the slave voltage $V_{R1}$ waveform 252 as it is ramping down. Consequently, the sub-harmonic recovery to load transient event performance of the switching regulator 100 is significantly enhanced over that of existing switching regulators. Also, under transient load conditions, the switching regulator 100 has higher switching frequency, decreased ripple, and substantially better overall transient response than existing switching regulators.

Figure 2:
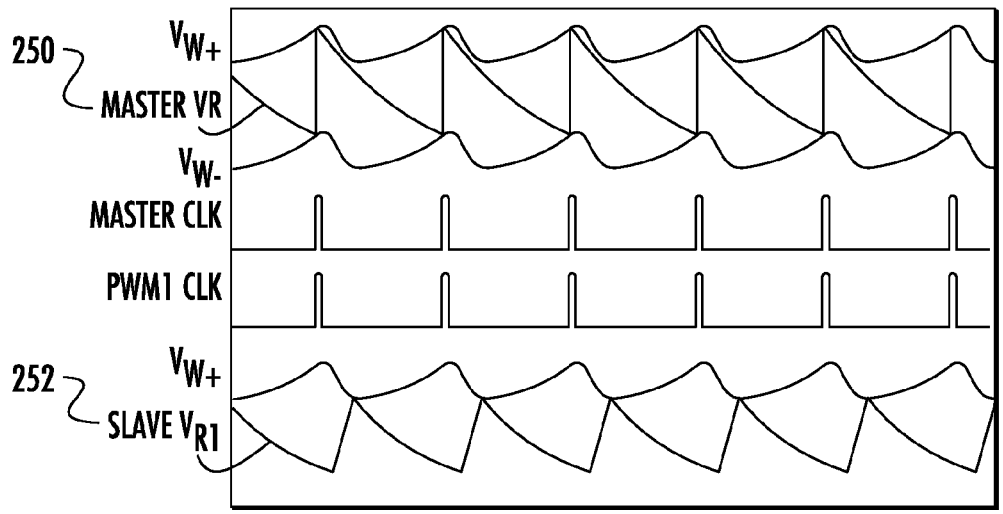
FIG. 2 depicts waveform diagrams that illustrate how the curvature of the ripple voltage waveform in the master controller circuit shown in FIG. 1 very closely approximates the curvature of the ripple voltage waveform in the slave controller circuit shown.

In operation, the current sink 115 in the master controller circuit 102 draws a substantially constant current, $g_m*V_{DAC}$, from the ripple node 112, and draws a charge from the ripple capacitor, Cr 117. The sensed ripple current on line 110 is added to the current, $g_m*V_{DAC}$, at the ripple node 112. When the switch SW2 125 is open, the voltage, $V_R$, at the ripple node 112 ramps down substantially at a constant rate. When the voltage, $V_R$, at the ripple node 112 drops to the level of the negative window voltage, $V_{W-}$, the comparator 113 outputs a signal that triggers the 1-SHOT to generate the master clock 105. In turn, the master clock 105 pulse (MASTER CLK in FIG. 2) closes the switch, SW2 125, and also sets the RS flip-flop 142. While the switch, SW2 125, is closed, the voltage, $V_R$, on the ripple capacitor Cr 117 rises quickly (with respect to the leading edge of the MASTER CLK pulse) to the level of the positive window voltage, $V_{W+}$. After the master clock pulse (MASTER CLK) is over, the switch, SW2 125, is open and the voltage, $V_R$, at the ripple node 112 ramps down at substantially a constant rate, aside of a slight curvature, as indicated in FIG. 2. However, as illustrated by the waveform diagrams depicted in FIG. 2, note that due to the addition of the sensed ripple current from the slave controller circuit 104 to the current at the ripple node 112 in the master controller circuit 102, the curvatures of the waveforms of the master's ripple voltage, $V_R$ 250, and the slave's voltage, $V_{R1}$ 252, very closely approximate each other as they are ramping down.

Figure 3:
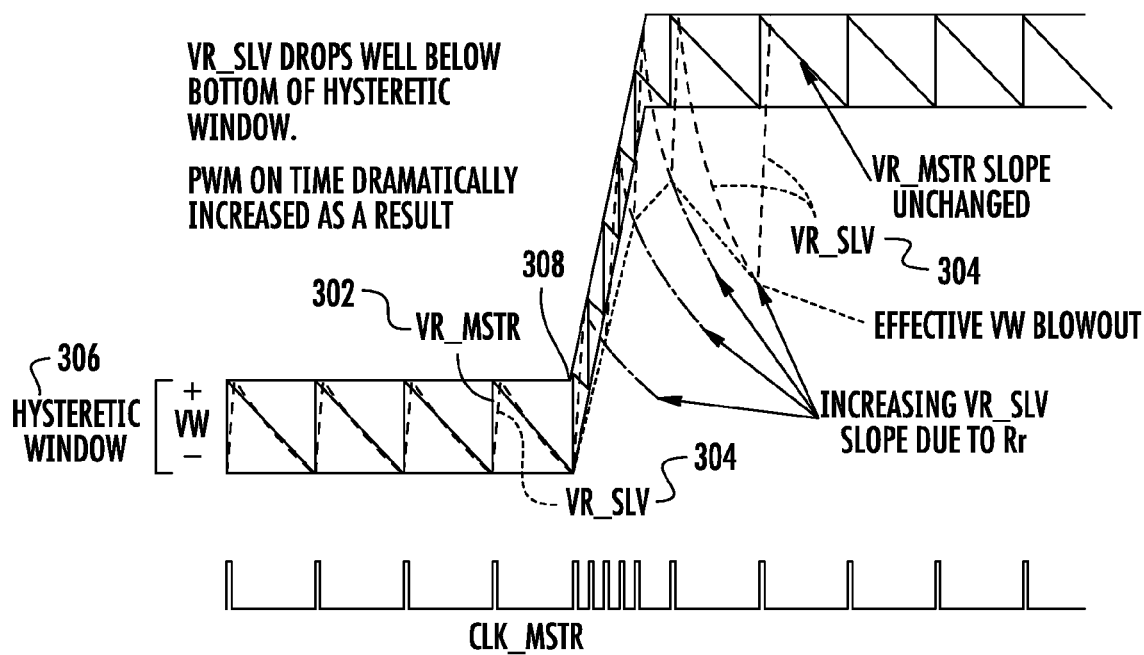
FIG. 3 depicts a waveform diagram that illustrates the primary problem caused by a design flaw in some existing master/slave peak current-mode PWM switching regulators.

FIG. 3 depicts a waveform diagram that illustrates a problem in some existing master/slave peak current-mode PWM switching regulators. More precisely, FIG. 3 depicts an example of a problem that occurs during load insertion (load rapidly increasing from low to high) in existing switching regulators. Without utilizing the slave-to-master ripple current coupling shown in FIG. 1, the master and slave ripple voltages, VR_MSTR 302 and VR_SLV 304, become separated as the hysteretic window (VW) 306 moves away from its steady state operating point (e.g., beginning at 308). As the slave ripple voltage VR (dashed line) 304 separates away from the master ripple voltage VR 302, the PW modulation on and off times are increased, which results in lower switching frequency, increased ripple, and poorer overall transient response in the switching regulators involved. Note that the slave's ripple voltage 304 in this switching regulator has dropped well below the lower limit (VW−) of the hysteretic window 306 (e.g., effective VW blowout).

Specifically, although existing peak (or valley) current-mode PWM switching regulators often include ripple resistors in the slave controller circuits, the design flaw inherent in each of these switching regulators is that the curvatures of the master's ripple voltage and slave's ripple voltage are significantly different over the switching regulators' dynamic operating ranges. As a result, the existing peak (or valley) current-mode PWM switching regulators experience large signal anomalies, sub-harmonic recovery to load transient events, and output voltage over-shoot during dynamic output voltage slewing (e.g., if dynamic DVID is utilized). However, as described in detail below, the present invention provides enhanced switching regulators that couple the ripple resistor current in the slave controller circuit to the master controller circuit, which cures the above-described design flaw inherent in existing switching regulators.

For example, referring to FIG. 3, note that as the load is inserted at 308, the slope of the slave VR voltage waveform 304 is increasingly negative while the slope of the master VR voltage waveform 302 remains the same. For example, the slopes of the ripple voltage waveforms VR_MSTR 302 and VR_SLV 304 are approximately the same until the load is increased at 308. At this point, the curvature of the slave VR voltage waveform 304 begins to increase. This increase in the curvature of the slave VR voltage waveform 304 is caused by the voltage developed across the ripple resistor in the slave. Consequently, the slave VR voltage 304 drops well below the hysteretic window VW 306 (e.g., effective VW blowout), and the on time of the PW modulator in the slave is dramatically increased as a result.

Figure 4:
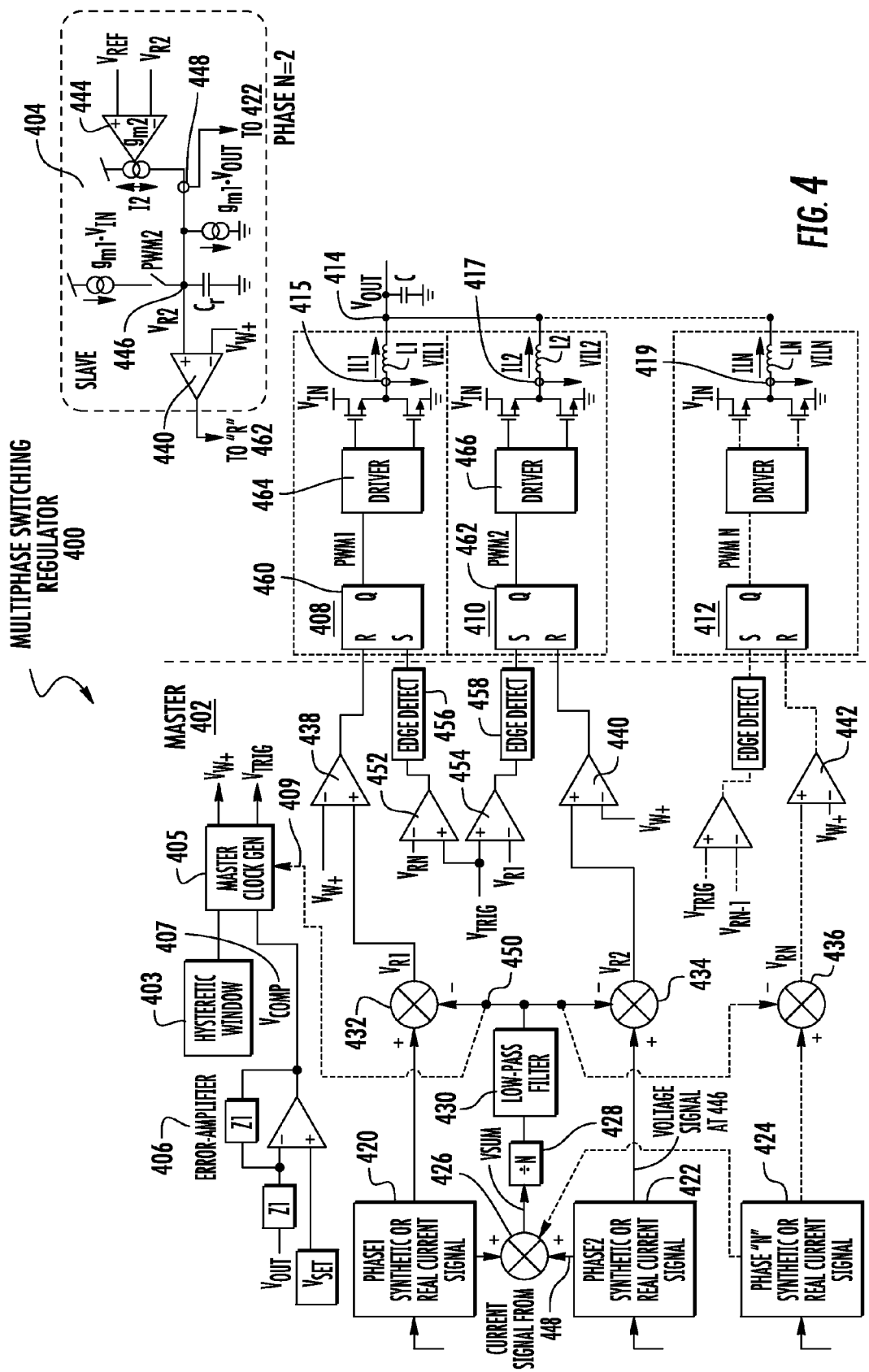
FIG. 4 depicts a schematic circuit diagram of a multiphase switching regulator, which can be utilized to implement a second exemplary embodiment of the present invention.

FIG. 4 depicts a schematic circuit diagram of a multiphase switching regulator 400, which can be utilized to implement a second exemplary embodiment of the present invention. For example, the multiphase switching regulator 400 can be utilized to implement one or more multiphase peak current-mode (or valley current-mode) PWM switching regulators. In the exemplary embodiment depicted in FIG. 4, a multiphase peak current-mode switching regulator includes a plurality of cross-coupled, ripple resistor circuits. In other words, "cross-coupled" can be interpreted to mean that the multiphase switching regulator 400 develops a scaled sum of the ripple resistor (Rr) currents from the phases of the slave controller circuits, and shares the scaled sum of the ripple resistor (Rr) current with each of the phases and also with the master clock generator. In one embodiment, developing a "scaled sum" or "scaling a sum of" means "averaging". As such, for example, the cross-coupled, ripple resistor circuits shown in FIG. 4 can be utilized to couple the phase currents from a plurality of slave controller circuits to a master controller circuit without having to include a ripple resistor in the master controller circuit involved.

In the exemplary embodiment shown in FIG. 4, the multiphase switching regulator 400 is a multiphase peak current-mode PWM switching regulator with phase current sharing between any number "N" of phases, in which N is any positive integer greater than one. In a second embodiment, the multiphase switching regulator 400 can be implemented as a multiphase valley current-mode switching regulator with phase current sharing between the N phases. In the embodiment depicted in FIG. 4, the multiphase switching regulator 400 includes a master controller circuit 402, a slave controller circuit 404 for each phase (e.g., N is equal to 2 for the slave controller circuit 404 depicted in this embodiment), and an error amplifier 406. In this embodiment, the master controller circuit 402 includes all of the circuitry depicted to the left of the dashed blocks 408, 410 and 412 (as indicated by the vertical dashed line). The threshold signals, $V_{TRIG}$, for the master controller circuit 402 are generated at a first output of the master clock generator 405, and a positive window voltage, $V_{W+}$, is provided at a second output of the master clock generator 405. The common error amplifier 406 outputs the compensation voltage, $V_{COMP}$ 407, which is coupled to an input of the master clock generator 405. The output of a hysteretic window generator circuit 403 is coupled to a second input of the master clock generator 405. The master controller circuit 402 and the multiple slave controller circuits (e.g., 404 for one exemplary phase) generate the output voltage, $V_{OUT}$, in response to the input compensation voltage, $V_{COMP}$ 407 for the plurality of phases involved.

The common error amplifier 406 receives the $V_{OUT}$ and $V_{SET}$ voltages and outputs the compensation voltage, $V_{COMP}$, which is utilized as the trigger voltage, $V_{TRIG}$ for two phases. However, for N greater than 2, a different trigger voltage, $V_{TRIG}$, is generated in response to the compensation voltage, $V_{COMP}$ 407 and the number of phases, N, by the hysteretic window generator 403 and the master clock generator 405, as will be discussed below. This trigger voltage, $V_{TRIG}$, is distributed to each of the N phase networks, which are depicted in this embodiment (dashed lines) as a first phase network 408, a second phase network 410, and so on up to the last or Nth phase network 412. The phase networks 408-412 are coupled to a common output node 414 that develops an output voltage, $V_{OUT}$. An output (filter) capacitor, C, is connected between the output node 414 and circuit ground.

In a first exemplary embodiment, the actual ("real") phase currents IL1, IL2, . . . ILN, respectively, are sensed utilizing suitable current sensor circuits 415, 417, . . . 419, and thereby measured to provide corresponding current sense voltages VIL1, VIL2, . . . VILN, respectively. The current sense voltage VIL1 is a voltage value that is proportional to the phase current IL1, the current sense voltage VIL2 is a voltage value that is proportional to the phase current VIL2, and the current sense voltage VILN is a voltage value that is proportional to the phase current ILN. In this embodiment, the current sense voltage VIL1 is coupled to the phase 1 current value unit 420 for the first phase network 408, the current sense voltage VIL2 is coupled to the phase 2 current value unit 422 for the second phase network 410, and the current sense voltage VILN is coupled to the phase N current value unit 424 for the Nth phase network 412. Each one of the phase current value units 420, 422, . . . 424 develops a corresponding phase current value for each "real" current value VIL1-VILN directly or indirectly measured by the current sensor for the respective phase network involved. The phase current values from the phase current value units 420, 422, . . . 424 are coupled to respective inputs of a combiner 426 (e.g., adder), which adds the phase current values together and outputs a phase current sum value, VSUM. The phase current sum value, VSUM, is coupled to the input of a divider 428, which divides the phase current sum value, VSUM, by the number of phases (N), and outputs a corresponding or scaled sum phase current value to a filter 430, such as, for example, a low-pass filter or the like. The filter 430 provides a scaled sum phase current value to the inverting input of each one of a plurality of combiners 432, 434, . . . 436 for the phase networks 408, 410, . . . 412, respectively. Each phase current value from the phase current value units 420, 422, . . . 424 is coupled to a non-inverting input of a corresponding one of the combiners 432, 434, . . . 436, which output the voltage values VR1-VRN, respectively. The voltage values VR1-VRN are coupled to the non-inverting inputs of corresponding comparators 438, 440, . . . 442 for each of the phase networks 408, 410, . . . 412 involved.

In a second exemplary embodiment, a synthetically generated ripple voltage indicative of the ripple current signal is developed in each of the slave controller circuits and coupled to the respective phase current value unit 420, 422, . . . 424. Note that, in this embodiment, the terms "synthetic current", synthetic voltage", "synthetic ripple current", "synthetic ripple voltage," "synthetically generated ripple current", or "synthetically generated ripple voltage" refer to the fact that the ripple capacitors' voltages (e.g., VR2) synthesize the ripple currents of the inductors (e.g., L2) of the phases. Furthermore, as it is shown in the second phase slave controller 404, the ripple resistor coupled between each ripple voltage node and reference voltage in each slave controller circuit may be replaced with a transconductance amplifier that is tuned to substantially simulate or match the same current or voltage otherwise developed through or across the ripple resistor in other embodiments. As such, the current developed by the transconductance amplifier (444) is substituting for the current generated by the ripple resistor in the slave controller circuit involved.

Specifically, referring to the exemplary slave controller circuit 404 depicted in FIG. 4, the ripple resistor (e.g., Rr 108 in FIG. 1) is replaced with a transconductance amplifier 444. The reference voltage, $V_{REF}$, is coupled to the non-inverting input of the amplifier 444, and the phase 2 ripple voltage, $V_{R2}$, at the ripple node 446 is coupled to the inverting input of the amplifier 344. The output of the transconductance amplifier 444 is coupled to the ripple node 446. The transconductance amplifier 444 converts the input voltages to an output current. Specifically, the transconductance amplifier 444 has a transconductance gain of gm2 and thus amplifies the difference between the input voltages, $V_{REF}$ and $V_{R2}$, by gm2 to provide the output current, I2 (e.g., for phase 2). The output current, I2, is coupled to the ripple node 446. As such, the current, I2, is developed according to the equation I2=gm2*($V_{REF}-V_{R2}$) and applied to the ripple node 446. The output impedance of the transconductance amplifier 444 is virtually constant and high. In the exemplary embodiment depicted in FIG. 4, the gain gm2 of the transconductance amplifier 444 is tuned to track the value of the replaced ripple resistor, by choosing gm2=1/Rr2. Thus, the transconductance amplifier 444 effectively simulates the function of the replaced ripple resistor typically coupled between the voltages, $V_{REF}$ and the ripple voltage, $V_{R2}$ (e.g., the ripple resistor, Rr 108 shown in FIG. 1).

In this second exemplary embodiment, the output current I2 of the transconductance amplifier 444 is sensed by a suitable current sensor circuit 448. The current sensor circuit 448 can be implemented utilizing suitable current sensing circuitry as known in the art, such as, for example, a resistor connected in series with the current I2 to develop a voltage proportional with I2. The sensed current I2 is fed from the phase 2 synthetic current signal block 422 to the combiner 426 where it is added to the similarly sensed transconductance amplifier output currents of the other phases. The synthesized ripple voltage VR2 for phase 2 is coupled to the combiner 434 from the phase 2 synthetic current signal block 422, and similarly the appropriate synthesized ripple voltages of other phases are coupled to other combiners (e.g., 432, 436) of those other phases.

In summary, in the exemplary embodiment depicted in FIG. 4, each of the N slave controller circuits (e.g., 404 for phase 2) is configured to utilize a "cross-coupled Rr" or ripple resistor circuit to mirror the scaled sum ripple resistor current in that slave to the master clock generator circuit 405. This function of mirroring the scaled sum ripple resistor current to the master clock generator circuit 405 is indicated by the dashed line 409, which effectively couples the scaled sum ripple resistor current value at the output of the filter 430 from the node 450 to the ripple node in the master clock generator 405.

Note that the error amplifier 106 and master controller circuit 102 described above with respect to FIG. 1 can be utilized for the embodiment depicted in FIG. 4 to perform the functions of the hysteretic window circuit 403, master clock generator 405, and error amplifier 406 shown. For example, the dashed line 409 shown in FIG. 4 can be depicted as coupled to the ripple node 115 shown in FIG. 1. The error amplifier 406 can be implemented by the error amplifier 106 in FIG. 1 to produce the compensation signal, $V_{COMP}$, 407 utilizing the compensation voltage, $V_{COMP}$, 107 shown in FIG. 1. Also, the hysteretic window circuit 403 and the master clock generator circuit 405 can be implemented by the master controller circuit 102 shown in FIG. 1. In accordance with the teachings of the present application, any suitable circuitry that can perform the above-described functions of the error amplifier 406, hysteretic window circuit 403, and master clock generator 405 can be utilized to receive the scaled sum ripple resistor current value (or a voltage corresponding to the scaled sum ripple resistor current value) from the node 450 and output the positive window voltage, $V_{W+}$ and threshold voltages, $V_{TRIG}$, shown in FIG. 4.

The trigger voltage, $V_{TRIG}$, is coupled from the master clock generator 405 to the non-inverting input of each of a pair of comparators 452, 454. The inverting input of the comparator 452 receives a ripple voltage, $V_{RN}$ (e.g., output from combiner 436), and the inverting input of comparator 454 receives a ripple voltage, $V_{R1}$ (e.g., output from combiner 432). The output of the comparator 452 is coupled to the input of an edge detect module 456 (corresponding to the 1-SHOT in FIG. 1), and the output of the comparator 454 is coupled to the input of a second edge detect module 458. The output of the edge detect module 456 is coupled to the set (S) input of the RS flip-flop 460, and the output of the edge detect module 458 is coupled to the set (S) input of the RS flip-flop 462. The Q output of the RS flip-flop 460 provides the first PWM signal (PWM1), and the Q output of the RS flip-flop 462 provides the second PWM signal (PWM2). The PWM1 signal is coupled to the input of a switch driver module 464, and the PWM2 signal is coupled to the input of a second switch driver module 466. In response to the PWM1 signal, the switch driver module 464 controls the switching of its pair of electronic switches to produce the phase current IL1. In response to the PWM2 signal, the switch driver module 466 controls the switching of its pair of electronic switches to produce the phase current IL2. Note that the comparator 440 for the phase 2 slave controller circuit 404 is also the comparator 440 coupled between the combiner 434 and the RS flip-flop 462. As such, assuming that the N phase controller circuits are structurally and functionally similar, the comparator 438 is the comparator in the phase 1 slave controller circuit and the comparator 442 is the comparator in the phase N slave controller circuit.

In summary, in the exemplary embodiment depicted in FIG. 4, the N phase networks (e.g., 408, 410, 412) alternate in activation to equally share the current load to the output node for driving a load. In one aspect of the embodiment, the actual or "real" output phase currents of each of the N slave controllers are averaged (i.e., scaled sum is developed), and the scaled sum of the output phase currents is shared with each phase. In a second aspect of the embodiment, the actual or "real" ripple resistor currents of each of the N slave controllers are averaged (i.e., scaled sum is developed), and the scaled sum of the ripple currents is shared with each phase. In a third aspect of the embodiment, the synthetically-generated ("synthetic") ripple resistor currents of each of the N slave controllers are averaged (i.e., scaled sum is developed), and the scaled sum of the "synthetic" ripple resistor currents is shared with each phase. Thus, in accordance with the teachings of the present application, the scaled sum of the ripple resistor currents of the slave controller circuits is utilized in the master controller circuit to enhance the performance of the switching regulator by causing the curvatures of the waveforms of the master's ripple voltage and the slaves' ripple voltages to be approximately the same.

Figure 5:
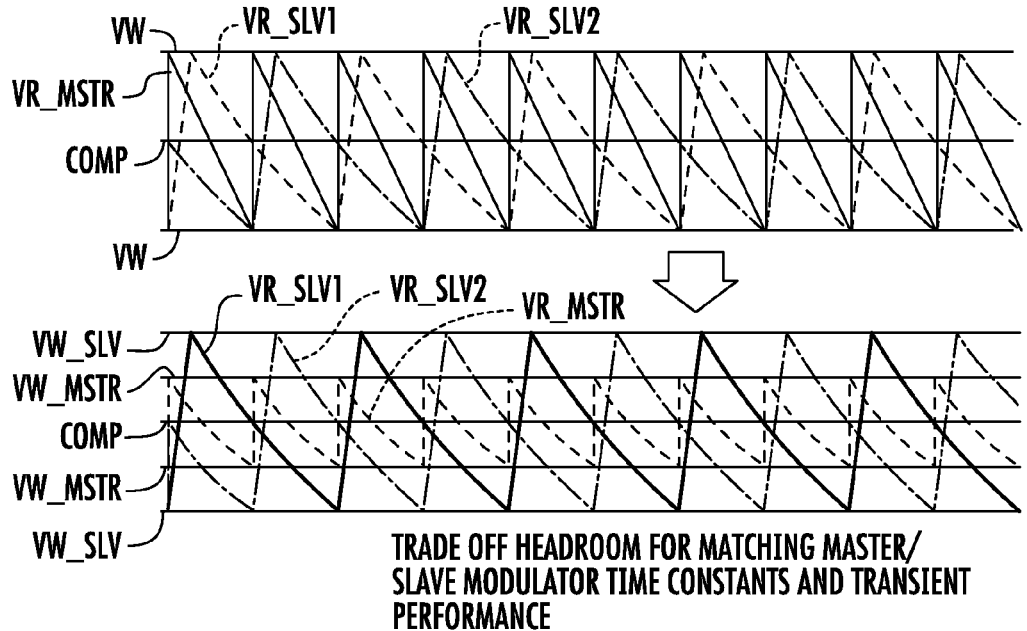
FIG. 5 depicts two waveform diagrams that illustrate the enhanced performance of a multiphase peak current-mode switching regulator in which the scaled sum of the ripple resistor currents in the slave controllers is mirrored into the master clock generator circuit, in accordance with one exemplary embodiment of the present invention.

FIG. 5 depicts two waveform diagrams that illustrate the enhanced performance of a multiphase peak current-mode switching regulator in which the scaled sum of the ripple resistor currents in the slave controllers is mirrored into the master clock generator circuit, in accordance with one exemplary embodiment of the present invention. More precisely, FIG. 5 depicts exemplary waveforms for one embodiment (described below with respect to FIGS. 7A and 7B), wherein the size of the hysteretic window for the master controller is reduced by the number of active phases of the slave controllers involved, in accordance with the following equation:

$$Vw\_master=Vw\_slave/N, \text{ where } N \text{ is equal to the number of active slave phases.}$$

This relationship enables a proper master switching frequency (Fsw) of:

$$Fsw\_master=Fsw\_slave*N, \text{ where } N \text{ is equal to the number of active phases.}$$

In this case, the ripple capacitor value of the master controller, Cr_master, can be equal to the ripple capacitor value of the slave controller, Cr_slave, while still maintaining the proper switching frequency. By utilizing the same value ripple capacitor, Cr, in both the master and slave controllers, a ripple resistor, Rr, can be added to the master controller to match the time constant of the slave controller, and thereby provide the entire AC and DC slave ripple information to the master controller involved.

Specifically, in the example shown in FIG. 5, the values of the ripple capacitors Cr in the master controller circuit and the slave controller circuits are selected to be equal. Also, the value of the hysteretic window voltage, VW, in the master controller circuit is equal to the value of the hysteretic window voltages in the slave controller circuits divided by the number of phases involved (see lower set of waveforms). Changing the window size by 1/N keeps the frequency of the master equal to the frequency of the slave multiplied by N, where N is the number of active slave phases. Note that, as indicated in the lower waveform in FIG. 5, after adding the slaves' cross-coupled ripple resistor currents to the master controller circuit, the time constants of the voltages, VR, in the master and slaves (e.g., VR_MSTR, VR_SLV1, VR_SLV2) are more closely matched than in the upper waveform without the added cross-coupled ripple resistor current. Consequently, the transient performance of the master controller circuit and the slave controller circuits represented in the lower waveform diagram are significantly enhanced.

Figure 6:
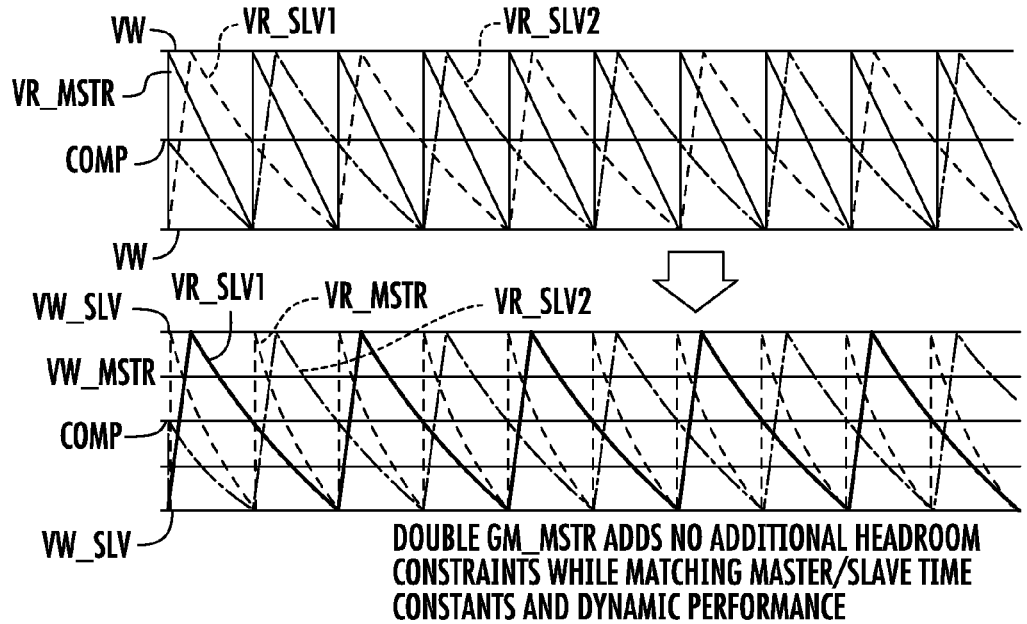
FIG. 6 depicts two waveform diagrams that illustrate the enhanced performance of a multiphase peak current-mode switching regulator in which the scaled sum of the ripple resistor currents in the slave controllers is mirrored in the master clock generator circuit, in accordance with a second exemplary embodiment of the present invention.

FIG. 6 depicts two waveform diagrams that illustrate the enhanced performance of a multiphase peak current-mode switching regulator in which the scaled sum of the ripple resistor currents in the slave controllers is mirrored in the master clock generator circuit, in accordance with a second exemplary embodiment of the present invention. More precisely, FIG. 6 depicts exemplary waveforms for one embodiment (described below with respect to FIGS. 8A and 8B), wherein the slope of the synthetic current for the master controller is reduced by the number of active phases of the slave controllers involved, in accordance with the following equation:

$$gm\_master=gm\_slave*N, \text{ where } N \text{ is equal to the number of active slave phases.}$$

This relationship enables a proper master switching frequency of:

$$Fsw\_master=Fsw\_slave*N, \text{ where } N \text{ is equal to the number of active phases.}$$

In this case, the value of the ripple capacitor of the master controller, Cr_master, can be equal to the value of the ripple capacitor of the slave controller, Cr_slave, while still maintaining the proper frequency. By utilizing the same value ripple capacitor, Cr, in both the master and slave controllers, a ripple resistor, Rr, can be added to the master controller to match the time constant of the slave controller, and thereby provide the entire AC and DC slave ripple information to the master controller.

Specifically, in the example shown in FIG. 6, the values of the ripple capacitors Cr in the master controller circuit and the slave controller circuits are selected to be equal. However, in this embodiment, and different from the embodiment depicted in FIG. 5, the value of the transconductance of the current source in the master controller circuit (GM_MSTR) is equal to the value of the transconductance of the current source in the slave controller circuit (GM_SLV) times the number of phases (N) involved. Note that, as indicated in the lower waveform, after adding the slaves' cross-coupled ripple resistor currents to the master controller circuit, the time constants of the voltages, VR_MSTR, VR_SLV1, VR_SLV2 in the master and slaves are much more closely matched than in the upper waveform without the added cross-coupled ripple resistor current. Consequently, the transient performance of the master controller circuit and the slave controller circuits represented by the lower waveform in FIG. 6 are significantly enhanced over the master and slave controller circuits in existing switching regulators. Also, note that doubling the transconductance value (the number of phases N=2 in this example) maintains the size of the hysteretic window and thus functions to maintain the signal-to-noise ratio (SNR). For example, the exemplary embodiment depicted in FIG. 5 reduces the master controller's hysteretic window by 1/N. However, the smaller the master controller's hysteretic window gets, the worse the SNR becomes. As such, in the embodiment depicted in FIG. 5, if the master's hysteretic window ($V_W$) is increased to keep the SNR in check, then the slave's hysteretic window ($V_W$)) gets larger, which results in potential headroom problems. However, in the embodiment depicted in FIG. 6, the size of the hysteretic window is maintained. Consequently, no additional headroom constraints are added in comparison with the embodiment depicted in FIG. 5.

Figure 7A:
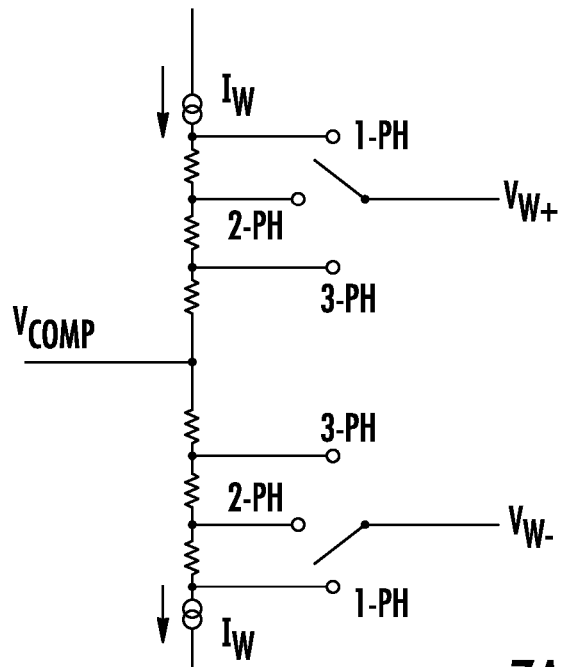
FIGS. 7A and 7B depict schematic circuit diagrams of exemplary master controller circuitry that can be utilized to implement the first enhanced multiphase implementation shown in FIG. 5.
Figure 7B:
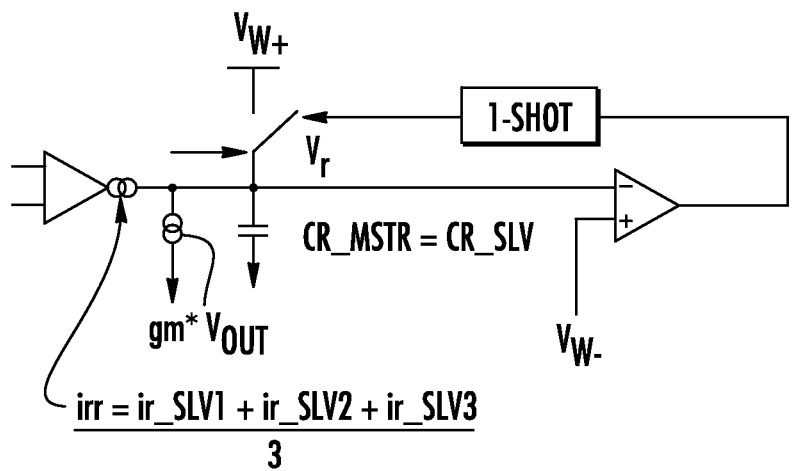

FIGS. 7A and 7B depict schematic circuit diagrams of exemplary master controller circuitry that can be utilized to implement the first enhanced multiphase implementation shown in FIG. 5. In this exemplary embodiment, the hysteretic window of the master controller is reduced in size by the number of active phases involved. One possible implementation is to add resistor segments/legs to the window generator circuit, and switch between them as a function of the active slave phases. In this case, the resistors have to be sized appropriately to achieve the following desired function:

$$Vw\_master=Vw\_slave/N, \text{ where } N \text{ is equal to the number of active slave phases.}$$

Also, in this exemplary embodiment, a simplified master VR circuit with cross-coupled ripple resistor (Rr) current is provided to generate appropriate time constant matching of the slave controller(s) involved.

Specifically, in the example embodiment depicted in FIG. 7A, the master controller circuitry for a three phase system is shown. The window generator circuitry shown can be utilized to generate the hysteretic window voltages $V_{W+}$ and $V_{W-}$ from the compensation voltage, $V_{COMP}$. In other embodiments, additional resistor segments/legs can be provided for more than three phases. In the embodiment shown in FIG. 7A, the compensation voltage $V_{COMP}$, which is generated at the output of an error amplifier, is coupled to a compensation node. A current source provides a window current, $I_W$, to one end of a first window resistor at a positive window node that develops a positive window voltage, $V_{W+}$. The other end of the first window resistor is connected to a second window resistor, and the other end of the second window resistor is connected to a second positive window node that develops the positive window voltage, $V_{W+}$, for a second phase. The other end of the second window resistor is connected to a third window resistor, which is connected to a third positive window node that develops the positive window voltage, $V_{W+}$, for a third phase. The other end of the third window resistor is connected to the compensation node.

The compensation node is also connected to one end of a fourth window resistor, and the other end of the fourth window resistor is connected to a negative window node, which develops a negative window voltage, $V_{W-}$ for the third phase. The negative window node for the third phase is connected to one end of a fifth window resistor, and the other end of the fifth window resistor is connected to a second negative window node, which develops the negative window voltage, $V_{W-}$ for the second phase. The second negative window node is connected to one end of a sixth window resistor, and the other end of the sixth window resistor is connected to a third negative window node, which develops the negative window voltage, $V_{W-}$ for the first phase. A current sink sinks the window current, $I_W$, from the negative window node for the first phase. Each one of the first through sixth window resistors has substantially the same resistance so that the window voltages, $V_{W+}$ and $V_{W-}$, are offset from the voltage on the compensation node by substantially the same amount in, for example, a balanced window voltage configuration. A first switch component selects a positive window node for a desired number of phases, and a second switch component selects a corresponding negative window node for the desired number of phases.

In the example embodiment depicted in FIG. 7B, the circuitry shown can be utilized to add the cross-coupled ripple resistor currents of the slave controller circuits to the master controller circuit involved. In this embodiment, the values of the ripple capacitor in the master controller and the ripple capacitors in the slave controllers are selected to be substantially the same. As such, the circuitry shown in FIG. 7B can be utilized to develop a cross-coupled, scaled sum of the ripple resistor current, irr, to be added to the master controller, by dividing the sum of the ripple currents of the slave controllers (e.g., ir_SLV1+ir_SLV2+ir_SLV3) by the number of slave controllers involved (e.g., 3).

Figure 8A:
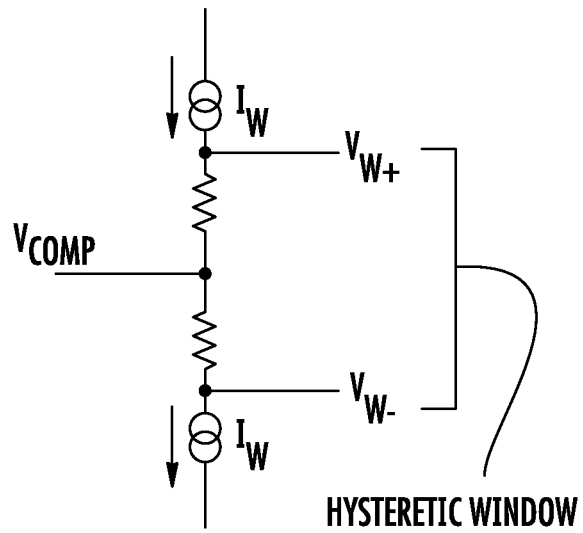
FIGS. 8A and 8B depict schematic circuit diagrams of exemplary master clock generator circuitry that can be utilized to implement the second enhanced multiphase implementation shown in FIG. 6.
Figure 8B:
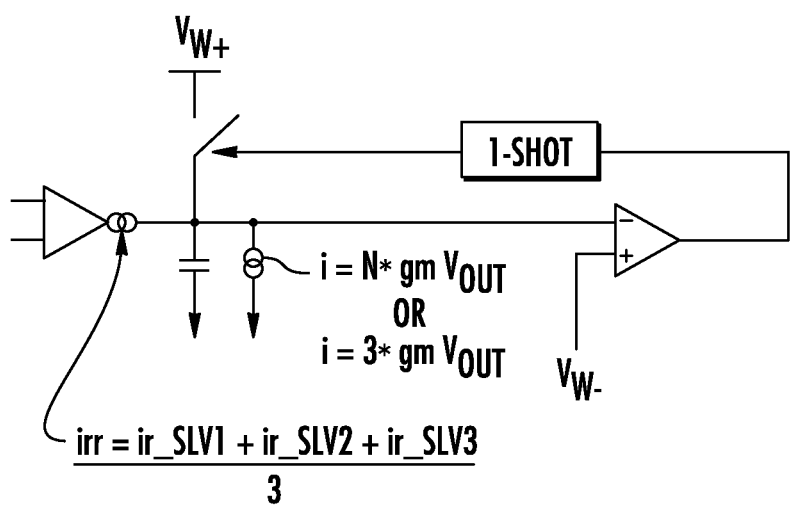

FIGS. 8A and 8B depict schematic circuit diagrams of exemplary master clock generator circuitry that can be utilized to implement the second enhanced multiphase embodiment depicted in FIG. 6. In this exemplary embodiment, the slope of the ripple voltage, VR, of the master controller is increased according to the number of active phases utilized. One possible implementation is to add current mirror segments/legs to the Cr pull-down current of the master, which are switched on by the number of active phases involved. In that case, the current mirrors would have to be sized appropriately to achieve the following desired function:

gm_master=gm_slave*N, where N is equal to the number of active slave phases.

In this embodiment, the hysteretic windows, VW, of the master controller and all of the slave controllers are substantially the same size.

Specifically, in the example depicted in FIG. 8A, the master controller circuitry for a three phase switching regulator system is shown. Since the hysteretic windows of the master controller and the slave controllers are substantially the same size, the window generator circuitry shown in FIG. 8A can be utilized to generate the hysteretic window voltages $V_{W+}$ and $V_{W-}$ for any number of phases (e.g., 3). In the embodiment shown in FIG. 8A, the compensation voltage $V_{COMP}$, which is generated at the output of an error amplifier, is coupled to a compensation node. A current source provides a window current, $I_W$, to one end of a first window resistor at a positive window node that develops a positive window voltage, $V_{W+}$. The other end of the first window resistor is connected to the compensation node. The compensation node is also connected to one end of a second window resistor, and the other end of the second window resistor is connected to a negative window node that develops a negative window voltage, $V_{W-}$. A current sink sinks the window current, $I_W$, from the negative window node.

The circuitry depicted in FIG. 8B can be utilized to add the cross-coupling ripple resistor current of the slave controller circuits to the master controller circuit involved. In this embodiment, the values of the ripple capacitor in the master controller and the ripple capacitors in the slave controllers are selected to be substantially the same. Thus, the transconductance value of the current source utilized in the master controller is substantially equal to the transconductance value of the current sources utilized in the slave controllers multiplied by the number of slave controllers involved. As such, the circuitry shown in FIG. 8B can be utilized to develop a cross-coupled, scaled sum of the ripple resistor current, irr, to be added to the master controller, by dividing the sum of the ripple resistor currents of the slave controllers (e.g., ir_SLV1+ir_SLV2+ir_SLV3) by the number of slave controllers involved (e.g., 3), without adding any additional headroom constraints to the design.

Figure 9:
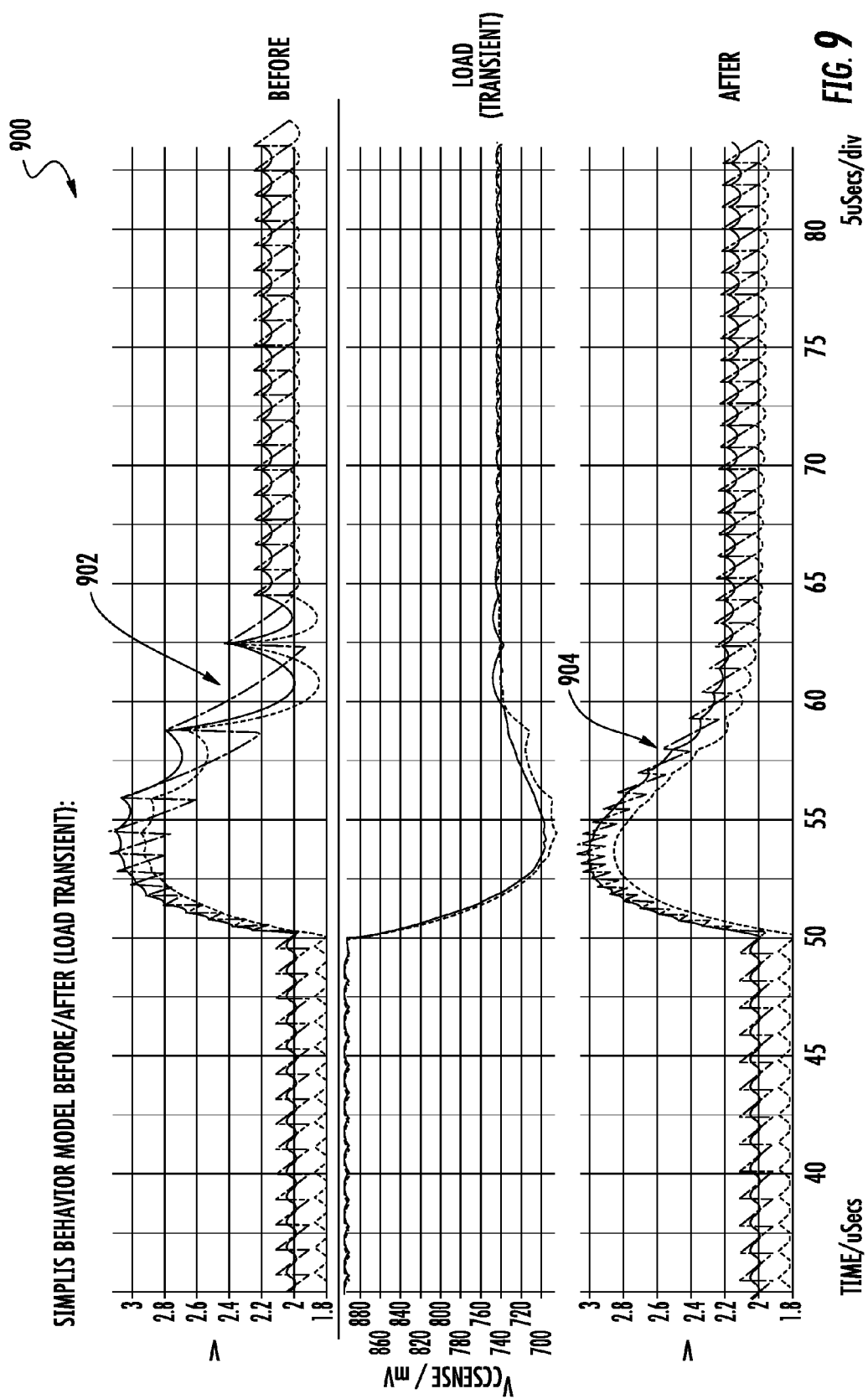
FIG. 9 depicts a simulated behavior model that illustrates the enhanced sub-harmonic recovery to load transient event performance for a multiphase peak current-mode PWM switching regulator implemented in accordance with an exemplary embodiment of the present invention.

FIG. 9 depicts a simulated behavior model 900 that illustrates the enhanced sub-harmonic recovery to load transient event performance for a multiphase peak current-mode PWM switching regulator implemented in accordance with an exemplary embodiment of the present invention. More precisely, FIGS. 9A and 9B depict load insertion waveforms (e.g., rapid transition from low load to high load) before and after a single-phase master/slave controller is implemented in accordance with an exemplary embodiment of the present invention. One set of waveforms (BEFORE) show the slave modulator signals VWP (top of the hysteretic window), VWM (bottom of the hysteretic window), and ripple voltage of the slave, VR_slave (e.g., synthetically-generated ripple current) before the simulation of the exemplary embodiment is implemented. The low frequency operation is clearly seen as the slave's ripple voltage separates from the master's ripple voltage (e.g., as illustrated in FIG. 3). Another set of waveforms show the output voltage response after (AFTER)

the simulation of the exemplary embodiment is implemented. Without implementation of the embodiment, the total output voltage undershoot and ripple are increased. Consequently, the output filter capacitance has to be increased to account for the resulting degradation in performance. Yet another set of waveforms show the slave modulator signals VWP (top of the hysteretic window), VWM (bottom of the hysteretic window), and VR_slave (slave synthetic current) after implementation of the embodiment. These waveforms show that the slave's ripple voltage, VR approximately matches that of the master's expected ripple voltage, VR (e.g., as illustrated in FIG. 2).

Specifically, as indicated at 902, note that without adding the slaves' ripple resistor currents to the master (BEFORE), the sub-harmonic recovery period subsequent to a load transient event is approximately 15 μsec. In comparison, as indicated at 904, which models the behavior of one embodiment of the present invention (AFTER), the sub-harmonic recovery period subsequent to the same load transient event is significantly reduced. Thus, the simulation shows that the sub-harmonic recovery to load transient event performance for a multiphase peak current-mode PWM switching regulator implemented in accordance with an exemplary embodiment of the present invention is enhanced significantly over that of existing multiphase peak current-mode PWM switching regulators.

Figure 10:
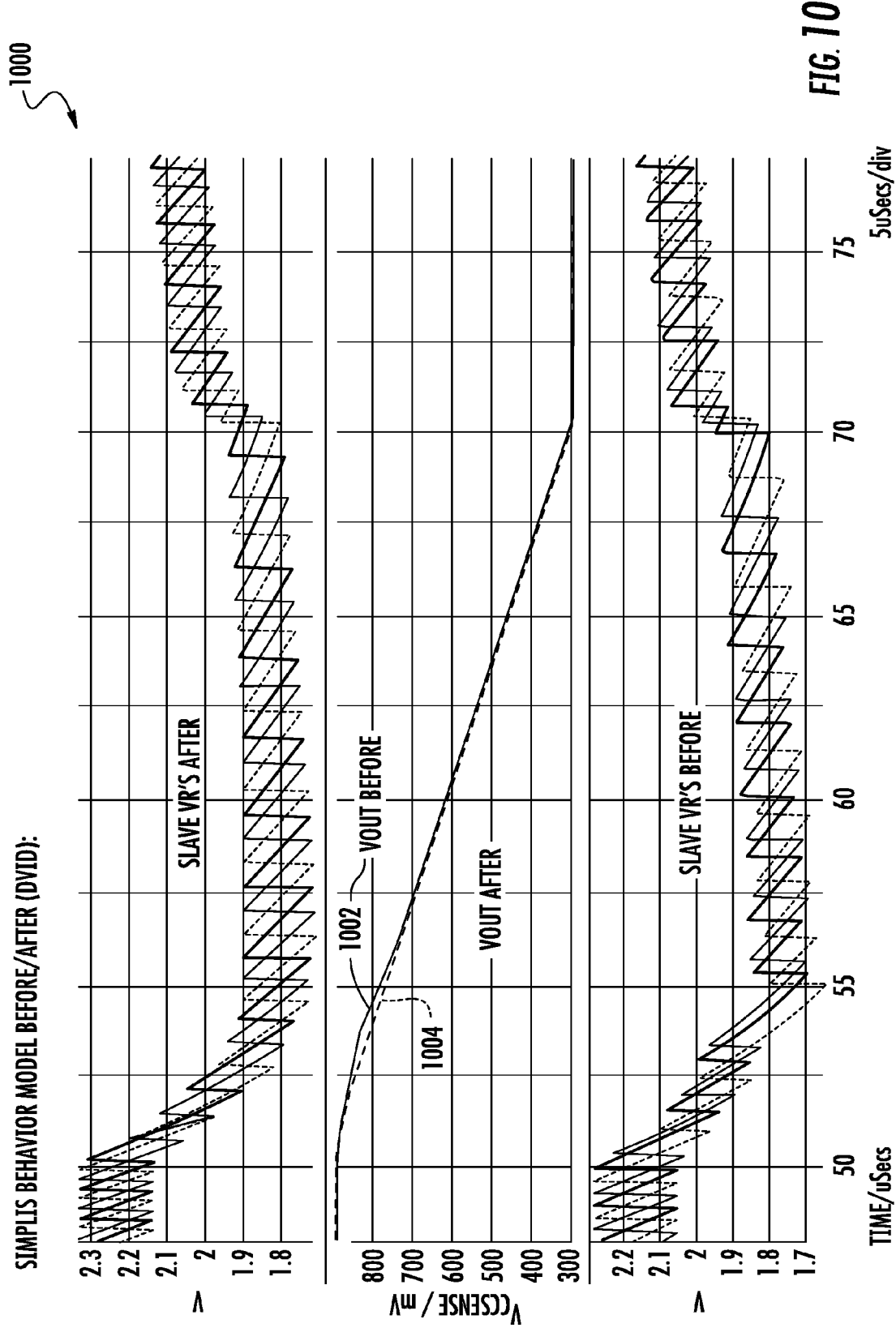
FIG. 10 depicts a simulated behavior model that illustrates the enhanced output voltage over-shoot performance during dynamic output voltage slewing for a multiphase peak current-mode PWM switching regulator implemented in accordance with an exemplary embodiment of the present invention.

FIG. 10 depicts a simulated behavior model 1000 that illustrates the enhanced output voltage over-shoot performance during dynamic output voltage slewing (e.g., DVID) for a multiphase peak current-mode PWM switching regulator implemented in accordance with one exemplary embodiment of the present invention. More precisely, FIG. 10 depicts high-speed downward output voltage slew waveforms before and after implementation of an exemplary embodiment in a 3-phase master/slave system. One set of waveforms shows each of the slave phase currents (VR1-3 indicated as bolded, not bolded and dashed lines) after the exemplary embodiment is implemented. Note that these slave phase currents are well-balanced and properly maintained at suitable levels. This performance enables smooth output voltage decay. A second set of waveforms shows the output voltage response before and after the exemplary embodiment is implemented. Before the exemplary embodiment is implemented, the output ripple is poorly controlled and lower frequency slave switching results in output voltage overshoot. In contrast, the output maintains a low-noise linear slew after the exemplary embodiment is implemented. Yet another set of waveforms shows the ripple voltages (VRs) of the slaves before the exemplary embodiment is implemented. These waveforms show the elongated switching period and poor phasing alignment that results in output voltage overshoot during dynamic output voltage slewing.

Specifically, as indicated at 1002, note the substantial output voltage over-shoot that occurs if the slaves' ripple resistor currents are not added to the master (VOUT before). In comparison, as indicated at 1004, there is little or no output voltage over-shoot for the modeled multiphase peak current-mode PWM switching regulator implemented in accordance with an exemplary embodiment of the present invention (VOUT after). Also note that the time constants of the voltages, VR, in the slaves implemented in accordance with one or more exemplary embodiments of the present invention (top diagram—slave VR's after) are more closely matched than in the existing slaves (bottom diagram—slave VR's before). As such, FIG. 10 illustrates that the frequency performance of a peak current-mode PWM switching regulator implemented in accordance with one or more exemplary embodiments of the present invention is significantly enhanced over that of existing peak current-mode PWM switching regulators.

Figure 11:
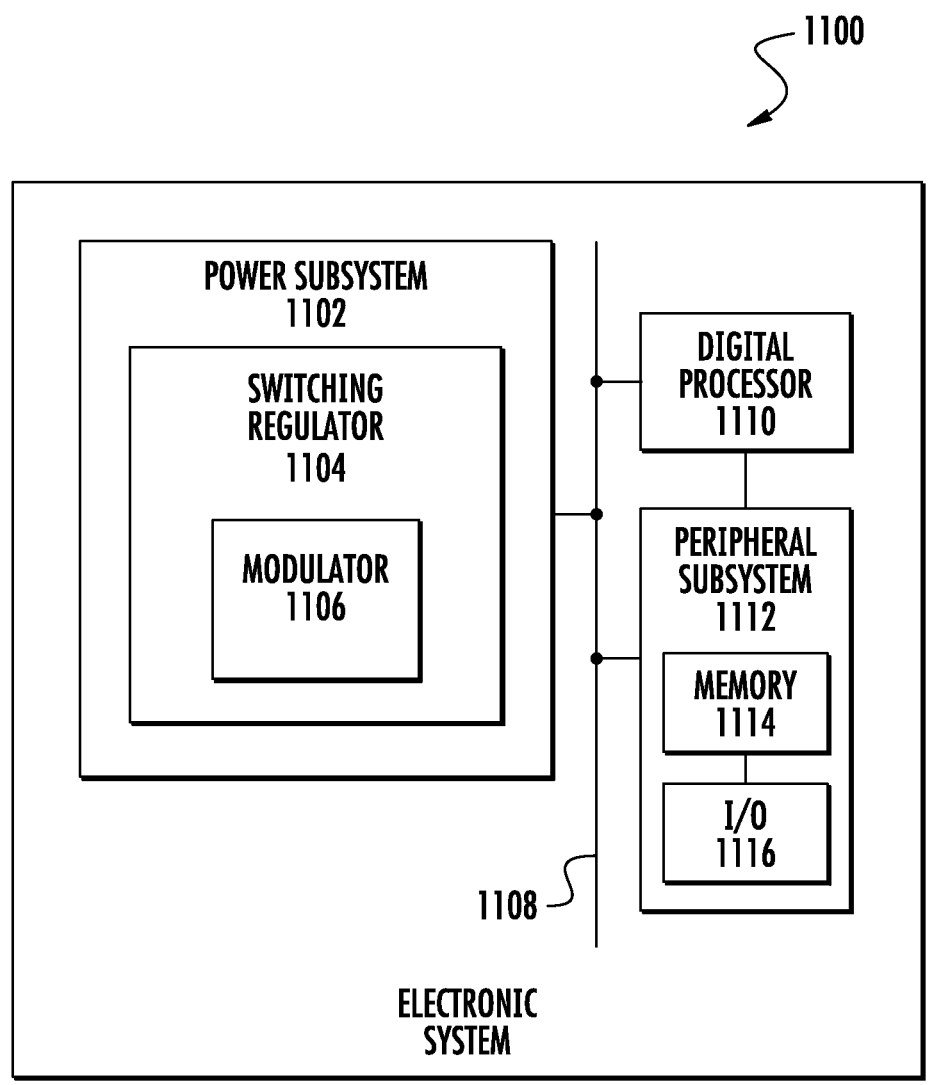
FIG. 11 depicts a block diagram of an electronic system, which can be utilized to implement one exemplary embodiment of the present invention.

FIG. 11 depicts a block diagram of an electronic system 1100, which can be utilized to implement one exemplary embodiment of the present invention. In the exemplary embodiment shown, electronic system 1100 includes a power subsystem 1102, a digital processor unit 1110, and a peripheral subsystem 1112. For example, the digital processor unit 1110 can be a microprocessor or microcontroller and the like. The peripheral subsystem 1112 includes a memory unit 1114 for storing the data processed by the digital processor unit 1110, and an input/output (I/O) unit 1116 for transmitting and receiving the data to/from the memory unit 1114 and the digital processor unit 1110. In the exemplary embodiment depicted in FIG. 11, power subsystem 1102 includes a switching regulator 1104, and a modulator 1106 for controlling the modulation and switching frequencies of the switching regulator 1104. The switching regulator 1104 provides a regulated voltage via line 1108 to power the electronic components in the digital processor unit 1110 and peripheral subsystem 1112. In the exemplary embodiment shown, the switching regulator 1104 can be implemented, for example, utilizing the multiphase peak current-mode PWM switching regulator 400 depicted in FIG. 4. In one or more embodiments, the components of the electronic system 1100 can be implemented in one or more integrated circuits, wafers, chips or dies.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present application be limited only by the claims and the equivalents thereof.

What is claimed is:

1. A method of control for a current-mode PWM switching regulator, comprising:
   generating a first ripple voltage in the current-mode PWM switching regulator;
   controlling a switching frequency of a first PWM switch in the current-mode PWM switching regulator with the first ripple voltage;
   coupling the first ripple voltage to a second ripple node in the current-mode PWM switching regulator;
   generating a second ripple voltage responsive to the first ripple voltage at the second ripple node; and
   controlling a switching frequency of a second switch in the current-mode PWM switching regulator with the second ripple voltage.

2. The method of claim 1, wherein the generating the first ripple voltage comprises generating the first ripple voltage in a slave controller circuit in the current-mode PWM switching regulator, and the generating the second ripple voltage comprises generating the second ripple voltage in a master controller circuit in the current-mode PWM switching regulator.

3. The method of claim 1, wherein the generating the second ripple voltage comprises adding the first ripple voltage to a voltage developed across a ripple capacitor in a master controller circuit in the current-mode PWM switching regulator.

4. The method of claim 1, wherein the method is performed in a multiphase peak current-mode PWM switching regulator or a multiphase valley current-mode PWM switching regulator.

5. The method of claim 1, wherein the generating the first ripple voltage comprises generating the first ripple voltage in a slave controller circuit on a first semiconductor integrated circuit, wafer, chip or die, and the generating the second ripple voltage comprises generating the second ripple voltage in a master controller circuit on a second semiconductor circuit, wafer, chip or die.

6. A method to control a current-mode ripple regulator including one or more phases, one or more phase controllers corresponding to the one or more phases, and a master controller, comprising:
  generating two threshold voltages responsive to an output signal of an error amplifier;
  generating a master clock signal responsive to a master ripple voltage and the two threshold voltages;
  generating one or more ripple voltages corresponding to said each one or more phases;
  generating one or more ripple currents associated with the one or more ripple voltages;
  generating a scaled sum ripple current for the one or more ripple currents;
  coupling the scaled sum ripple current to the master ripple voltage;
  coupling the scaled sum ripple current to the one or more ripple voltages; and
  generating a PWM control signal corresponding to each of the one or more phases responsive to the corresponding ripple voltage and the two threshold voltages.

7. The method of claim 6, wherein the current-mode ripple regulator comprises a synthetic current-mode ripple regulator, and the generating one or more ripple voltages comprises generating one or more synthesized ripple voltages.

8. The method of claim 6, wherein the generating the two threshold voltages comprises generating the two threshold voltages responsive to a compensation signal.

9. The method of claim 6, wherein the generating the master clock signal comprises a master clock circuit in the master controller generating the master clock signal.

10. The method of claim 6, wherein the generating the scaled sum ripple current comprises a summing and averaging circuit generating an average ripple current.

11. A switching regulator, comprising:
  a master controller circuit; and
  a slave controller circuit coupled to the master controller circuit, wherein the slave controller circuit is configured to generate a ripple current at a first ripple node, and a sensor circuit configured to sense the ripple current at the first ripple node and convey the sensed ripple current to a second ripple node in the master controller circuit, wherein the master controller circuit is configured to add the sensed ripple current to a current present at the second ripple node, and thereby control a switching frequency of a switch coupled to the second ripple node.

12. The switching regulator of claim 11, wherein the ripple current comprises a current through a ripple resistor in the slave controller circuit.

13. The switching regulator of claim 11, wherein the ripple current comprises a synthesized ripple current.

14. The switching regulator of claim 11, wherein the switching regulator comprises a peak current-mode Pulse-Width-Modulated (PWM) switching regulator or a valley current-mode PWM switching regulator.

15. The switching regulator of claim 11, wherein the sensor circuit is configured to sense the ripple current, develop a ripple voltage associated with the sensed ripple current, and convey the ripple voltage to the second ripple node.

16. The switching regulator of claim 11, wherein the first ripple node is connected to a first PWM switch and a first ripple capacitor in the slave controller circuit, and the second ripple node is connected to a second switch and a second ripple capacitor in the master controller circuit.

17. The switching regulator of claim 11, further comprising an error amplifier circuit coupled to the master controller circuit, and a phase output circuit coupled to the slave controller circuit, wherein the phase output circuit is configured to develop an output voltage for the switching regulator, and the error amplifier circuit is configured to develop a compensation signal to maintain the output voltage at a substantially constant value.

18. A multiphase switching regulator, comprising:
  a master controller circuit including a plurality of phase networks, wherein each phase network of the plurality of phase networks is configured to develop a corresponding phase current in the multiphase switching regulator; and
  a plurality of slave controller circuits, wherein each slave controller circuit of the plurality of slave controller circuits is configured to develop a corresponding ripple current and convey the corresponding ripple current to the master controller circuit, and wherein the master controller circuit is configured to develop a scaled sum ripple current value from the plurality of corresponding ripple currents, and share the scaled sum ripple current value with each phase network of the plurality of phase networks to develop the corresponding phase current.

19. The multiphase switching regulator of claim 18, wherein said each slave controller circuit of the plurality of slave controller circuits is configured to develop one of a corresponding ripple resistor-based ripple current or a corresponding synthetic ripple current.

20. The multiphase switching regulator of claim 18, wherein the master controller circuit includes a master clock generator circuit configured to receive the scaled sum ripple current value and generate a positive window voltage and a trigger voltage to control the phase current in said each phase network.

21. The multiphase switching regulator of claim 18, wherein said each slave controller circuit includes a corresponding sensor circuit configured to sense and convey the corresponding ripple current to the master controller circuit.

22. The multiphase switching regulator of claim 20, further comprising an error amplifier circuit and a hysteretic window generator circuit coupled to the master clock generator circuit.

23. The multiphase switching regulator of claim 18, wherein the multiphase switching regulator comprises a multiphase peak current-mode PWM switching regulator or a multiphase valley current-mode PWM switching regulator.

24. An electronic system, comprising:
  a digital processor;
  a peripheral subsystem coupled to the digital processor; and
  a power subsystem coupled to the digital processor and circuit components of the peripheral subsystem and configured to generate an output voltage to power the digital processor and the circuit components of the peripheral subsystem, wherein the power subsystem includes a switching regulator configured to regulate an output voltage of the power subsystem, the switching regulator comprising a master controller circuit and at least one slave controller circuit coupled to the master controller circuit, and the at least one slave controller circuit includes a first ripple node configured to develop a ripple current, and a sensor circuit configured to sense the ripple current and convey the sensed ripple current to a second ripple node in the master controller circuit, wherein the master controller circuit is configured to add the sensed ripple current to a current present at the second ripple node, and thereby control a switching frequency of a switch coupled to the second ripple node.

25. The electronic system of claim 24, wherein the switching regulator comprises a multiphase peak current-mode or valley current-mode PWM switching regulator.

\* \* \* \* \*